Nov. 15, 1938.  E. A. WINFIELD  2,136,959
FUEL SUPPLY SYSTEM
Filed Oct. 26, 1934  6 Sheets-Sheet 1
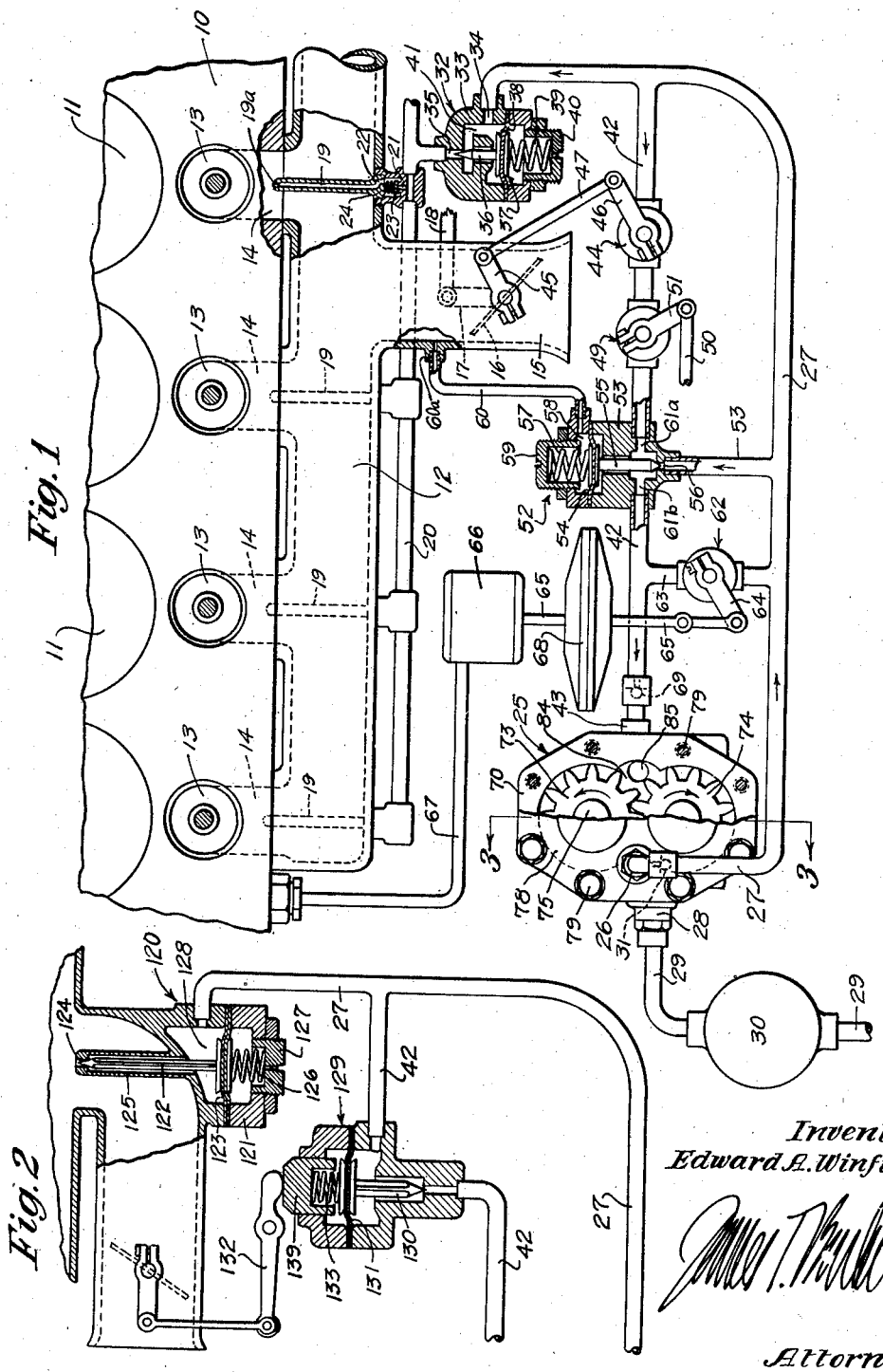
Inventor
Edward A. Winfield.
Attorney.

Nov. 15, 1938.  E. A. WINFIELD  2,136,959
FUEL SUPPLY SYSTEM
Filed Oct. 26, 1934
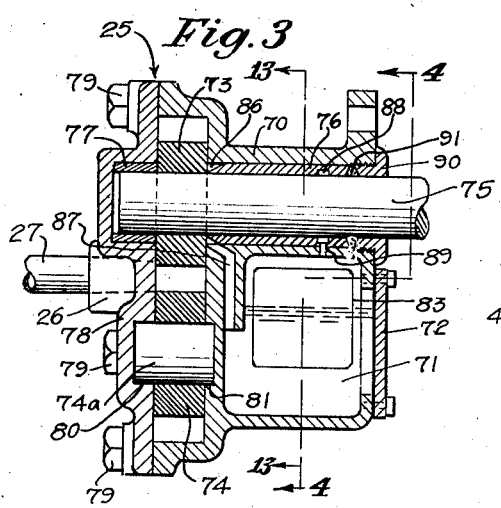
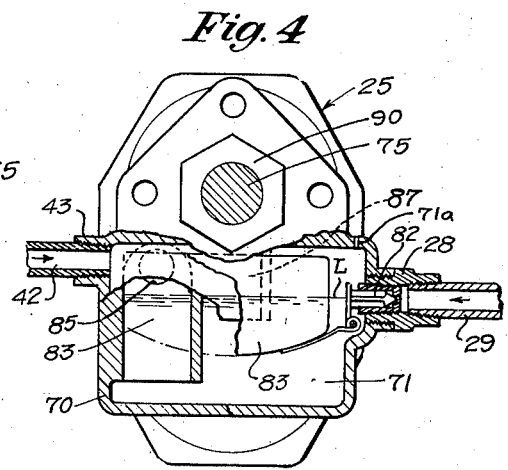
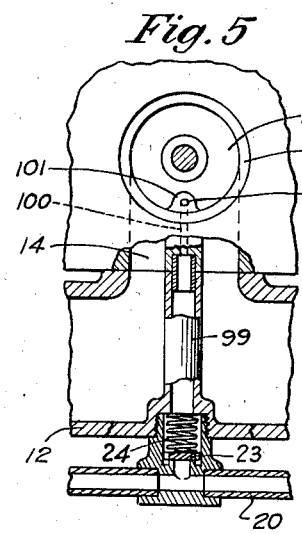
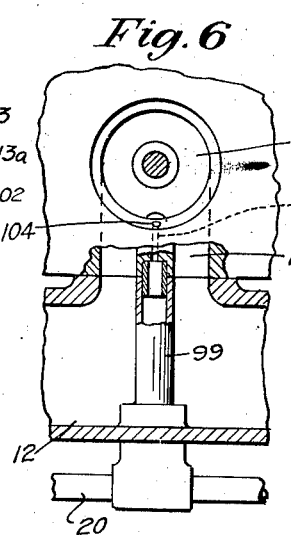
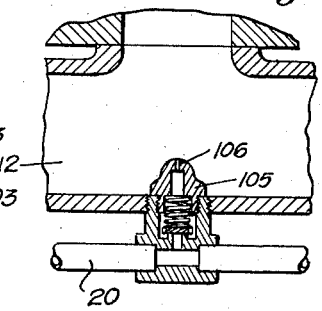
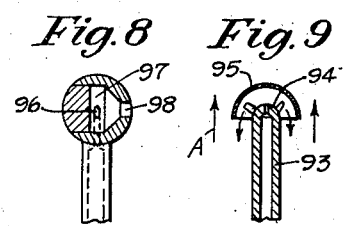
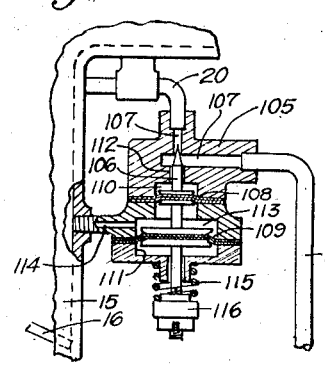
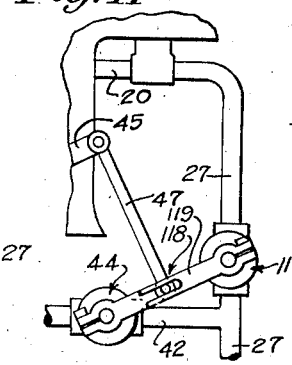
Inventor
Edward A. Winfield.
Attorney.

Nov. 15, 1938.                E. A. WINFIELD                2,136,959
                              FUEL SUPPLY SYSTEM
                              Filed Oct. 26, 1934            6 Sheets-Sheet 3
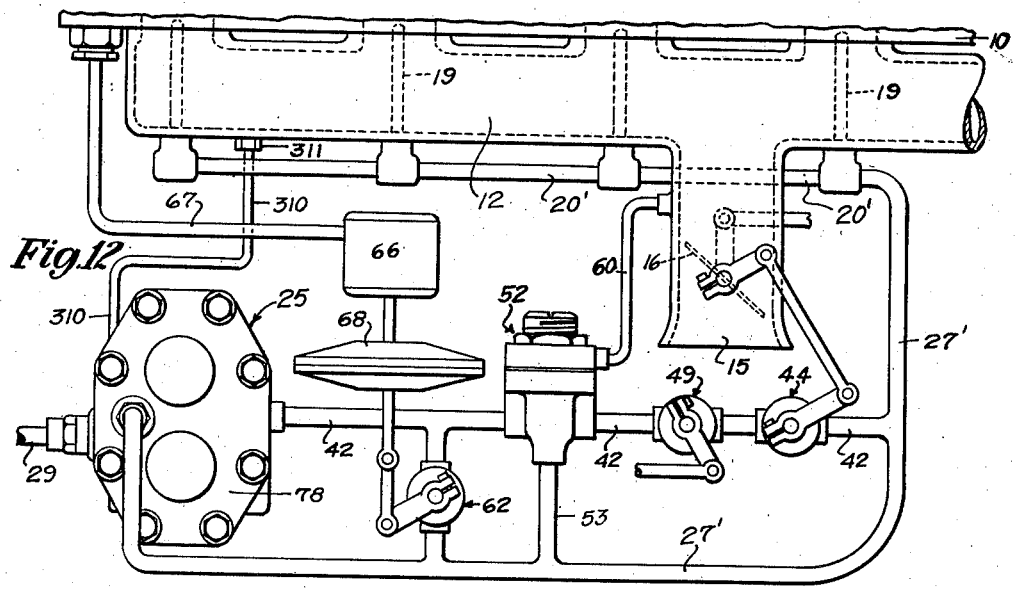
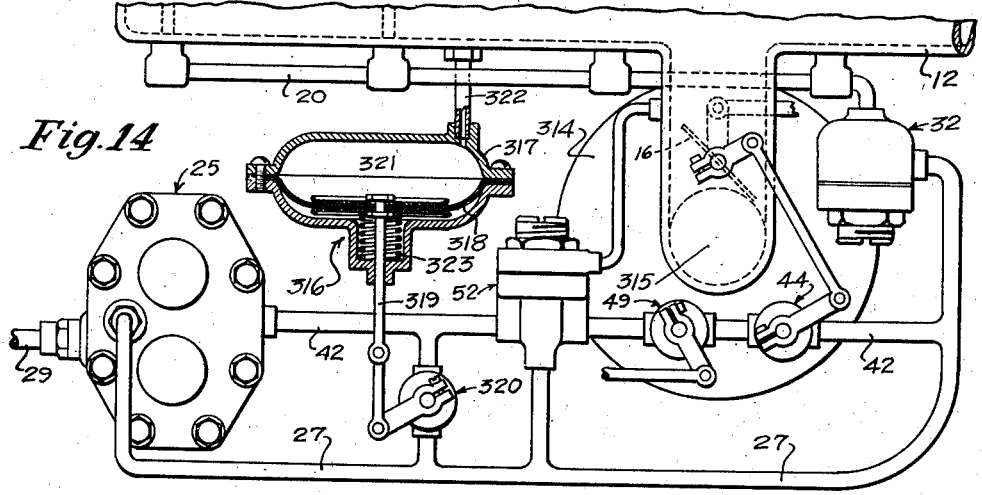
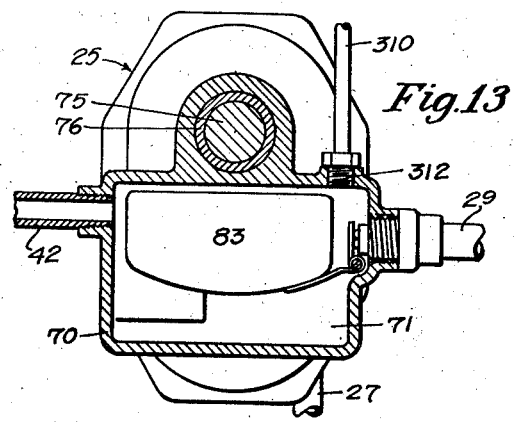
Inventor
Edward A. Winfield.
Attorney.

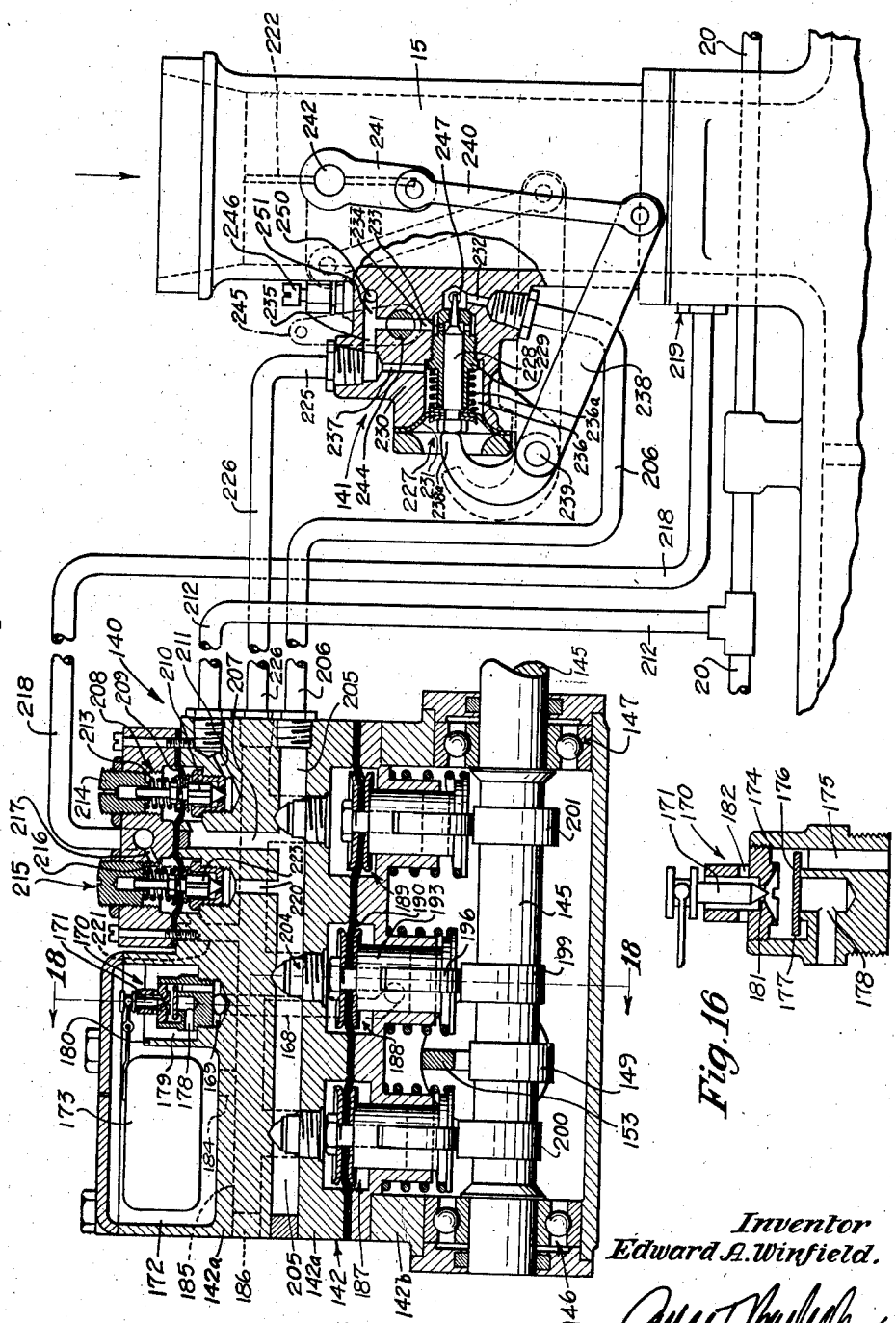

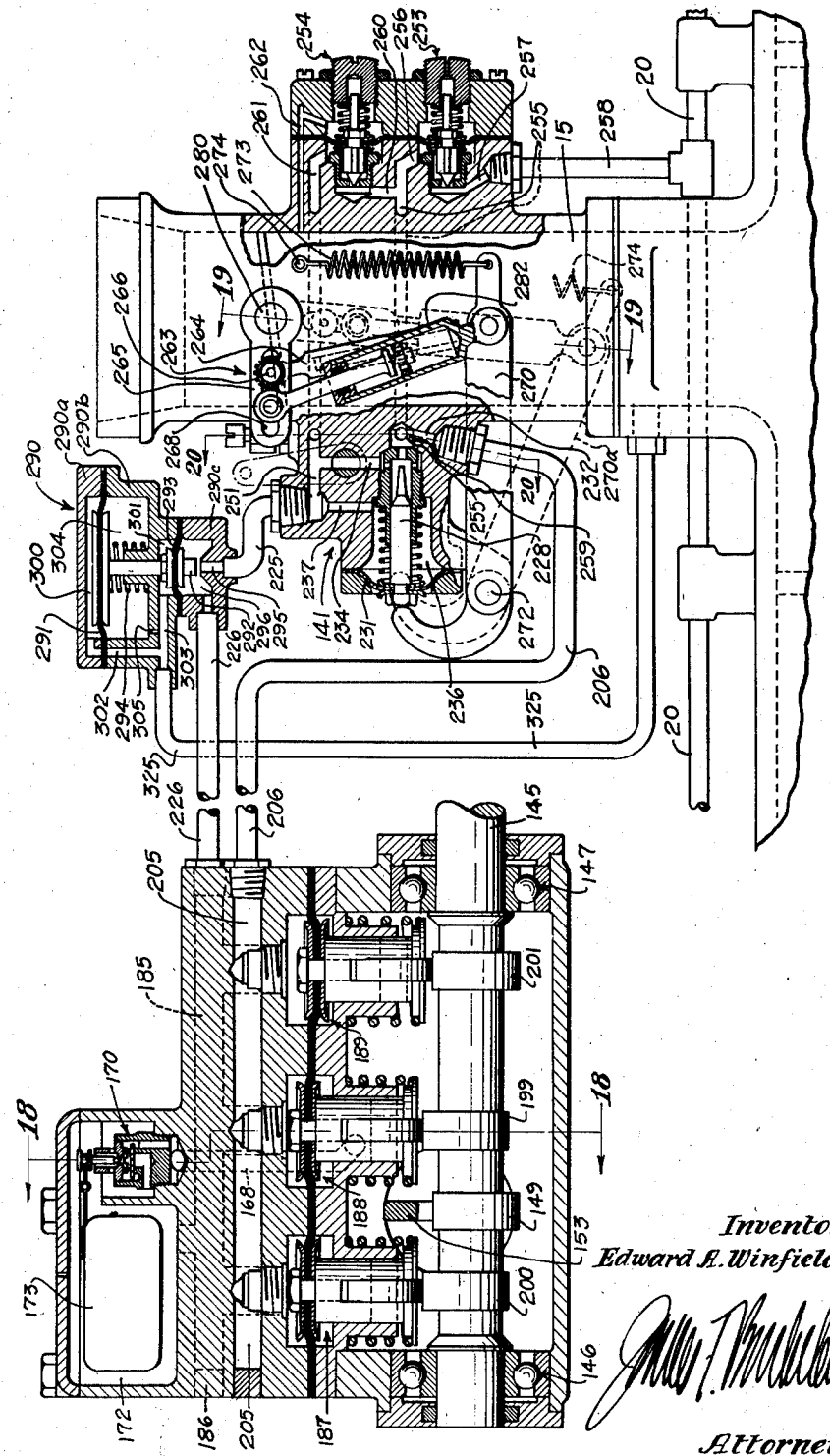

Inventor
Edward A. Winfield.

Attorney.

UNITED STATES PATENT OFFICE 2,136,959

FUEL SUPPLY SYSTEM

Edward A. Winfield, La Canada, Calif.

Application October 26, 1934, Serial No. 750,070

7 Claims. (Cl. 123—139)

This invention has to do generally with fuel supply systems for internal combustion engines, and relates more particularly to an improved pressure feed or injection type system broadly adaptable to either two-cycle or four-cycle engines. The invention may be further characterized relative to one of its major aspects and its general method of supplying fuel and air to the engine, as utilizing a throttle controlled air intake passage similar to that in usual carburetor systems, but differing from the latter in one respect, among others, in that the fuel is pumped and injected into the air stream beyond the throttle independently of, though modifiably in accordance with the air flow and manifold depression, instead of utilizing that depression to draw in and meter the fuel.

One of my principal objects is to provide a system that will overcome certain inherent disadvantages of the usual carburetor feed system, and in so doing materially increase the general efficiency of engine operation from standpoints of fuel economy, power and general performance. One of these inherent disadvantages is that the necessity for restricting the carbureting and intake manifold passages to the extent necessary for proper fuel metering and distribution to the various cylinders, reduces the volumetric and power efficiency of the engine, particularly at the higher operating speeds. If the carbureting passage be unrestricted sufficiently to give maximum volumetric efficiency, then it becomes impossible to obtain the relationships between the quantity of air flow and fuel metering depression necessary for proper performance under full throttle operating conditions at lower engine speed. Another commonly encountered disadvantage of carbureting systems is excessive condensing or depositing of fuel in the air passage or manifold, particularly when the engine is cold, and also at slow speed operation when the air velocity through the manifold is low. In an effort to overcome these limitations, various auxiliary devices such as air valves, manifold heaters and the like, have been employed.

In accordance with the invention, I overcome these limitations of the usual carburetor system, first, by utilizing a comparatively unrestricted, though throttle controlled air intake passage, to the end of promoting high volumetric efficiency, and second, by injecting the fuel under pressure into the air passage at a point beyond the throttle, and under conditions whereby fuel metering and delivery of metered fuel to the cylinders may be accomplished independently of such considerations as air velocities and pressure conditions in the air passage. However, while fundamentally unaffected by these considerations, the present system enables the fuel metering to be modified in accordance therewith, as will hereinafter appear more fully. I preferably feed the fuel by an engine driven pump, or a pump operated in timed relation with the engine, so that as the engine speed increases, the rate of fuel delivery by the pump and the fuel pressure will also, though not necessarily proportionately, increase. I maintain a suitable back pressure or restriction on the injection fuel delivered by the pump, as by the use of one or more valves set to inject fuel into the air passage or manifold, which may be controlled in accordance with various operating conditions, hereinafter discussed in detail. In order that the fuel will be suspended in the air stream flowing to the cylinders, and to eliminate the possibility of accumulation of liquid fuel in the greater part of the air passage or on the manifold walls, I preferably inject the fuel into that portion of the air passage leading directly to the cylinders, or directly at the intake valve ports.

By utilizing a fuel pump operated in timed relation to the engine speed, greater or lesser rates of fuel delivery occur as the engine speed increases or decreases. In view of the fact however that proper ratios of fuel to air are not determinable for all conditions of operation solely in accordance with engine speed, it becomes necessary to modify the fuel feed to meet, for example, varying load requirements with relation to engine speed. Such modification is accomplished by varying the injection fuel pressure in accordance with one or all of such considerations as, throttle position, engine speed, manifold pressure, temperature, and atmospheric pressure conditions. Preferably the injection fuel pressure is controlled in the manner stated by a by-pass system operating to return the high pressure pumped fuel to the supply source or suction side of the pump, the rate of flow of the by-passed fuel, and therefore the injection fuel pressure, being controlled according to variations in the above mentioned considerations.

All these features of the invention, as well as various additional objects and details will become fully apparent from the following description of certain illustrative and typical forms of the invention. Throughout the ensuing description reference is made to the accompanying drawings, in which:

Figure 1 is a general view, diagrammatic and sectional in parts, illustrating a fuel supply system embodying the invention;

Fig. 2 is a fragmentary and partially sectional view showing variational forms of injection and throttle controlled by-pass valves;

Fig. 3 is an enlarged section taken on line 3—3 of Fig. 1 through the fuel injection pump;

Fig. 4 is a section on broken line 4—4 of Fig. 3;

Figure 20:
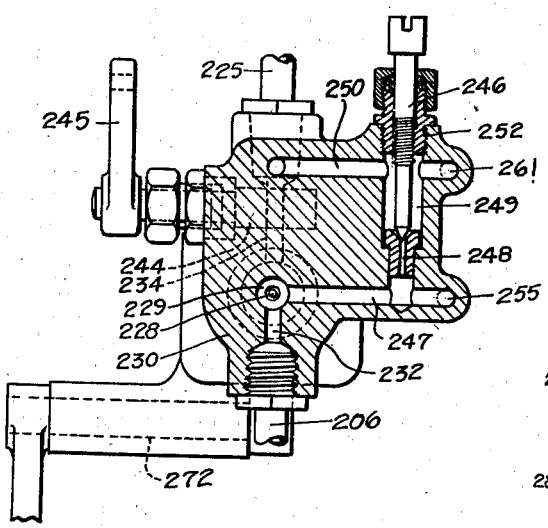
Figure 19:
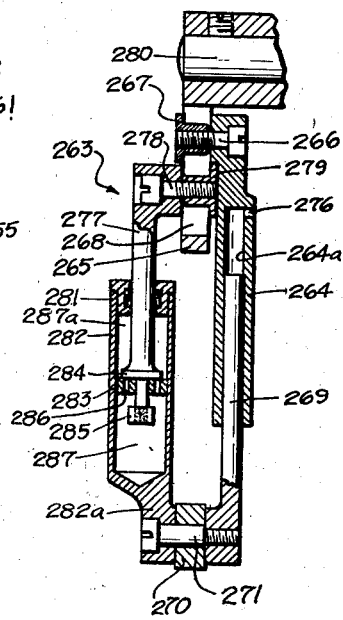
Figure 18:
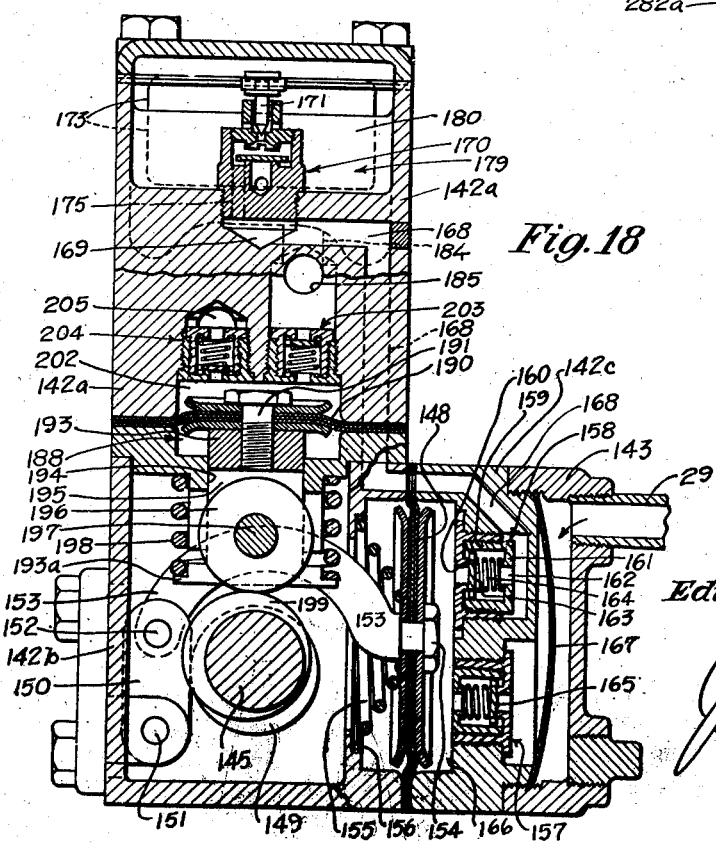

Figs. 5 to 9, inclusive, are enlarged fragmentary views showing variational forms of fuel injection nozzles;

Fig. 10 shows a variational form of injection or back pressure valve controllable in accordance with manifold pressure;

Fig. 11 is a similar view showing a variational form of the same valve controllable in accordance with throttle movements;

Fig. 12 illustrates a further variant form of the invention similar in purpose to those of Figs. 10 and 11;

Fig. 13 is a section taken through the fuel pump on line 13—13 of Fig. 3;

Fig. 14 shows a modified form of the invention designed for operation in conjunction with a supercharger;

Fig. 15 is a sectional view showing the details of the invention in one of its practical forms embodying in general the various features illustrated in the more diagrammatic showing of Fig. 1;

Fig. 16 is a fragmentary enlarged sectional view of the float controlled valve structure;

Fig. 17 is a view generally similar to Fig. 15, illustrating a variational form of the invention;

Fig. 18 is a fragmentary enlarged section taken on line 18—18 of Figs. 15 and 17;

Fig. 19 is a fragmentary enlarged section on line 19—19 of Fig. 17, assuming the parts to be in the dotted line positions; and Fig. 20 is an enlarged transverse sectional view taken on line 20—20 of Fig. 17.

In the general view of Fig. 1, the engine block is indicated at 10, the cylinders at 11, and the air intake manifold at 12, the latter communicating with intake valve ports 13 by way of the usual passages 14. The manifold 12 has an intake 15, the flow of air through which is controlled by throttle 16 operated in the usual manner through arm 17 and rod 18. It will be noted that the intake 15 is entirely unrestricted except by closing of the throttle valve, in distinction to the ordinary carbureter wherein the intake to the manifold is greatly restricted by the venturi, thus promoting highest volumetric efficiency in engine operation.

In the particular form shown in Fig. 1, fuel is injected into the intake manifold, or more properly speaking into passages 14 leading to the intake valve ports 13, through nozzles 19 connecting with a fuel manifold pipe 20. As will hereinafter appear, liquid fuel is injected through nozzles 19 by a pump operated in timed relation to the engine. Fuel flows from the manifold 20 to the nozzles through ports 21 and offset passages 22 in the threaded ends of the nozzles, and when the engine is not in operation, leakage of fuel from the fuel manifold through the nozzles is prevented by spring loaded check valves 23 closing ports 21, springs 24 being required to have only sufficient tension to seat the valves to prevent such leakage.

Liquid fuel is supplied manifold 20 by pump 25, which may be of any suitable type operated by or in timed relation with the engine, and discharging the fuel through outlet 26 connecting with high pressure supply line 27. Fuel is fed to the pump inlet 28 from a supply tank, not shown, either by gravity flow through line 29 or from a primary fuel pump diagrammatically illustrated at 30. A check valve 31 placed in line 27 near the outlet 26 prevents return flow to the pump when the latter is not in operation, in order that the supply line 27 and fuel manifold 20 will at all times be completely filled with fuel instantly available for starting the engine.

Valve 32 in high pressure line 27 operates to control the flow of fuel to fuel manifold 20 and to maintain a predetermined though variable back pressure in line 27. In the particular form shown in Fig. 1, valve 32 comprises a body 33 having an inlet 34 and an outlet 35, the flow of fuel through which is controlled by needle valve 36 attached at 37 to diaphragm 38 clamped between the body sections. Valve 36 is yieldably pressed toward seating position by coil spring 39 bearing against a cap 40 screwthreaded into the body, the spring tension being variable by adjusting the cap. The pressure existing in line 27 and within the interior space 41 of the valve body, acts against diaphragm 38 to open the valve against the resistance of spring 39. As the fuel pressure increases due to increased throttle opening or to increased speed of engine operation, and therefore increased speed of operation of pump 25, valve 36 opens correspondingly to permit greater rates of fuel flow into manifold 20. When the engine is not in operation, however, and no appreciable pressure exists in line 27, spring 39 acts to seat the needle valve 36. The tension of spring 39 is adjusted so that when the engine is started into operation, a fuel pressure against diaphragm 38 is in the neighborhood of from 1 to 2 lbs. per sq. in. or other suitable minimum operating pressure will start to open valve 36 to permit the flow of fuel to the engine.

For most satisfactory results, both from standpoints of efficiency and control, it is desirable that the fuel metering be substantially uninfluenced by changes in the air intake manifold pressure, except for the influence of the vacuum operated by-pass valve as later explained, and that the rate of fuel delivery be determined exclusively in accordance with the speed of operation of the fuel injection pump, except as that rate may be modified by later described devices whose operation is independent of the manifold pressure. Briefly stated, the valve device 32 operates to so modify the rate of fuel delivery to the engine as to compensate the effect that low manifold pressures at closed throttle positions would otherwise have upon the rate of fuel delivery.

To illustrate, in the absence of valve 32, during ranges of operation with the throttle in such open positions that no substantial depression exists in the manifold, the rate of fuel delivery would be solely in accordance with the speed of operation of the engine and pump 25. But as the throttle is progressively closed to the point at which a substantial depression exists in the manifold, there is added to the pressure differential (the difference between the pump pressure and substantially atmospheric manifold pressure) causing fuel to be injected through nozzles 19, the suction on the nozzle orifices 19a proportionate to the manifold depression. This added pressure differential of course would have the effect of increasing the rate of fuel delivery over that which would exist at the same pump speed with no substantial manifold depression. The primary purpose of valve device 32 is to compensate for this effect by restricting the fuel stream (with the same effect that would be accomplished by restricting nozzle orifices 19a) to an extent that will just compensate or offset the effect of the manifold depression.

The tension of spring 39 is adjusted so that at such times as no substantial depression exists in the manifold, as for example between quarter open and full open throttle positions, the fuel pressure against diaphragm 38 will hold valve 36 fully open. Under these conditions nozzle orifice 19a becomes the effective fuel metering restriction, uninfluenced by the valve device 32. As the throttle progressively closes, however, and a substantial manifold depression develops, spring 39 gradually closes valve 36, restricting the fuel stream to compensate for the added pressure differential resulting from the manifold depression, as explained above. In its closing positions, valve 36 then becomes the restricting influence, rather than nozzle orifices 19a, since the valve controlled passage 35 will have become reduced to a smaller effective fuel passing area than the combined areas of the nozzle orifices.

As explained, valve 32 by itself operates to pass fuel to the engine at a rate which increases as the engine speed and the fuel pressure in line 27 increase. However, since the proper fuel-to-air ratio in the combustible mixture supplied to the engine cannot be determined for all conditions of operation in accordance with engine speed alone, but must also be adjusted to meet the requirements of the engine when operating, for example, at different speeds with constant load or at constant speed with varying loads, it is necessary to include in the fuel supply system such compensating provisions as will produce the proper fuel mixtures for all the various conditions of engine operation. Generally speaking, such compensation and regulation is effected by varying the injection fuel pressure, in accordance with any or all of such factors as engine speed throttle position, air intake manifold pressure, temperature and atmospheric pressure conditions. In the broad contemplation of the invention, such regulation of the injection fuel pressure may be accomplished in various manners, although preferably, and I find most simply and conveniently, the fuel pressure is controlled or modified to suit the conditions imposed by these various factors, by a by-pass system, the details of which will now be explained.

A by-pass fuel line 42 connecting with the high pressure line 27, leads to a return flow inlet 43 of the pump 35. A valve 44, which may be of any suitable type, is operated from the throttle 16 by way of lever arms 45, 46, and connecting link 47. The purpose of valve 44 is to control the fuel pressure at the high pressure side of valve 32 in accordance with throttle movements, by regulating the flow of by-pass fuel through line 43 to the pump; and more specifically to increase the fuel pressure acting against diaphragm 38 fuel nozzles 19 as the throttle moves from closed to open position. When throttle 16 is closed, valve 44 is in its widest open position, allowing the maximum rate of fuel by-pass to the pump. Then, as the throttle is opened, valve 44 progressively moves toward closed position, restricting the by-pass stream and increasing the fuel pressure in line 27 acting against diaphragm 38 and the injection pressure within nozzles 19. Thus as the engine gains speed through the opening of the throttle, the pressure in line 27 increases, valve 36 opens further to increase the rate of fuel supply to the engine, and nozzles 19 become the effective restrictions in the fuel stream; and conversely as the throttle is closed.

Under starting conditions, when the engine requires a relatively rich mixture temporarily, the by-pass line 42 may be restricted or closed by a normally open valve 49 which may be manually closed to function in the general aspect of a choke valve by connection 50 attaching to the valve arm 51.

At such times as the engine itself is being driven by the vehicle, as while coasting on a down grade with the throttle closed, it is necessary to prevent excessive fuel discharge from the injection nozzles that would otherwise occur with pump 25 operating in timed relation with the engine and developing increased pressure in line 27 and increased rate of fuel injection because of the high engine speed, even though the throttle is closed. For the purpose of preventing this excessive fuel delivery under such conditions, I provide a vacuum or manifold depression controlled valve 52 operating to regulate the by-pass of fuel from line 42 via pipe 53. In the typical form illustrated, valve 52 comprises a body 53 containing a diaphragm 54 carrying needle valve 55 which controls the rate of fuel by-pass through orifice 56. Valve 55 normally is maintained in closed position by a spring 57 pressing down against the diaphragm, the spring tension, and therefore the minimum depression in space 58 required to open the valve, being adjustable by cap 59 screw-threaded into the body. Space 58 communicates through pipe 60 with the air intake manifold 12 at some suitable point beyond the throttle in the direction of air flow, the point of connection 60a being typically illustrated as leading into the intake passage 15 at a short distance beyond the throttle, although this point of connection may be located at any point along the manifold.

Under all normal high load operating conditions when the engine is driving the vehicle, needle valve 55 will remain closed, but under light load or partial throttle conditions it may open slightly to inject the minimum amount of fuel consistent with smooth engine operation. However, when the vehicle is driving the engine with throttle 16 closed and a resultant high depression in the manifold, the valve device 52 comes into operation, spring 57 being so adjusted that the depression in space 58 will cause the diaphragm to rise and valve 55 to open. Fuel is then by-passed from line 27 through pipe 53 into line 42 and thence to the pump, the rate of by-pass being sufficient to lower the fuel pressure at valve 32 to the point at which only sufficient fuel will be discharged to the engine to maintain a correct idling mixture or in some cases stop fuel injection completely. The normal operation of valves 44 and 49 is unaffected by the presence of valve 52 in the by-pass line, since the flow from port 61a to port 61b is uninterrupted.

An additional by-pass valve 62 placed in line 63 operates to control the rate of by-pass from the high pressure line to the pump in accordance with variations in temperature or atmospheric pressure conditions, or both. Valve 62 is operated in accordance with variations in engine temperature by way of lever 64 and rod 65 attached to a common thermostatic regulator diagrammatically indicated at 66, the latter connecting with the water circulating system of the engine through line 67 and acting to move rod 65 longitudinally as the water temperature changes. An altitude control device 68 of the usual diaphragm type may be connected with rod 65 in tandem with thermostat 66, since the compensating action of the one device will in no way affect the normal action of the other. As a leaner fuel to air ratio in the combustible mixture being fed to the cylinders is desired, either by reason of increasing engine temperatures or decreasing atmospheric air densities at the higher altitudes, the devices 66 and 68 will operate to open valve 62 to increase the rate of fuel by-pass through line 63, and therefore the injection fuel pressure. Check valve 69 may be placed in line 42 near the pump to prevent fuel drainage from the supply lines when the engine is not operating.

While as before mentioned, any suitable type of fuel pump 25 may be employed, I preferably use a gear pump of the type shown in detail in Figs. 1, 3 and 4. The pump comprises a body 70 shaped to form a float chamber 71 closed at one side by removable cover plate 72, and containing a pair of pumping gears 73 and 74, the former of which is driven by a shaft 75 which in turn is driven through any suitable connection (not shown) by the engine, or, broadly speaking, by any suitable power source operating in timed relation with the engine. Shaft 75 is journaled in bearings 76 and 77, the latter being contained in an end plate 78 attached to the body 70 by screws 79. Gear 74 is carried on a shaft 74a journaled at 80 and 81 in plate 78 and the body 70, respectively.

Fuel supplied to the pump flows into float chamber 71 under control of a needle valve 82 which is operated by the float 83 to prevent overfilling the float chamber. One of the main objects in providing a float chamber in conjunction with the pump is to completely free the fuel of air particles before the fuel is taken by the pump and injected into the engine. In the absence of such precaution, difficulties may arise as a result of the accumulation of air in the fuel line, manifested for example by irregular discharge of the fuel in slugs, instead of in an even liquid spray. Such possibility is obviated in the present system by reason of the fact that when the fuel enters the float chamber, any air particles carried by the fuel are allowed to separate out before the fuel enters the pump. The float chamber may be vented to the atmosphere in any suitable manner, as by way of orifice 71a.

Gears 73 and 74, rotating in the directions of the arrows shown in Fig. 1, create a depression within space 84 which causes fuel to be drawn up from the float chamber 71 through riser passage 83 (see Fig. 4) and then through port 85 into space 84. The fuel is then forced by the pumping action of the gears through outlet 26, see Fig. 1, into line 27. As shown in Fig. 3, the inner end of pump shaft bearing 76 is beveled to form annular channel 86, the bottom of which communicates with drain passage 87 leading down into the float chamber 71. Fuel tending to leak along shaft 75 flows first into the annular channel 86 and immediately drains back into the float chamber through passage 87. As further precautions against leakage between the shaft and its bearing, I provide an annular bearing groove 88 which drains through port 89 into the float chamber, and a bushing 90 compressing a packing annulus 91 against the end of bearing 76 and into sealing engagement with the shaft.

In Figs. 8 and 9 I show variational forms of nozzles of the general type illustrated in Fig. 1, and differing primarily in the provision of a baffle or other terminal attachment for securing complete atomization of the fuel. In Fig. 9, the fuel injected from nozzle 93 through orifice 94 is projected against a spherical baffle 95 which reverses the direction of the fuel flow and causes the fuel to be discharged outwardly into the air stream flowing countercurrently in the direction of arrows A. The combined effect of baffling the fuel and discharging it countercurrently into the air stream, is a reduction of the fuel to a fully atomized spray. In Fig. 8 the fuel is discharged tangentially through port 96 into circulating chamber 97 within the head of the nozzle, and is thence discharged through orifice 98 into the air stream. Atomization in this case is obtained by virtue of the rapid swirling flow of the fuel within chamber 97.

In Figs. 5, 6 and 7 I show further variational types of nozzles which differ primarily from the described forms as regards the location of and points of discharge within the manifold or air passages. In Fig. 5 the nozzle 99 extends the full distance from the outer wall of the manifold 12 through passage 14 to the wall of the intake port 13, and the fuel discharged through the nozzle passes via a restricted bore 100 extending below the valve seat 13a into an interior boss 101. The fuel is injected upwardly against the bottom face of the valve, not shown, and counter-currently to the inflowing air, through restricted orifice 102 leading upwardly from bore 100. In Fig. 6, fuel passing through restricted bore 103 is discharged upwardly through orifice 104 located in the valve seat itself. The type of nozzle 105 shown in Fig. 7 discharges the fuel through orifice 106 more directly into the manifold itself, as distinguished from injection directly within passage 14, although the nozzle is positioned opposite the latter so that the fuel is projected at high velocity into the air stream leading directly to the valve port. As will be seen, all the illustrated types of nozzles are designed and arranged to provide for the direct flow of finely atomized fuel to the valve ports, without opportunity being given the fuel to condense or deposit on the walls of the manifold or air passages.

I have previously explained how the valve device 32 operates to compensate the effect that the manifold depression at closed throttle positions would otherwise have in increasing the fuel injection pressure differential and the rate of fuel injection. This same compensation may be accomplished in various other ways, as illustrated in certain variations shown in Figs. 10, 11 and 12.

In Fig. 10 I show a valve device in the injection fuel line which is connected with the air intake or manifold beyond the throttle and which contains a valve which operates to restrict the fuel stream in response to depression communicated from the manifold to a diaphragm or other pressure responsive element. The valve body 105 connects with high pressure line 27 and the fuel manifold 28, and contains needle valve 106 controlling the fuel flow through passage 107. The needle valve is carried by diaphragms 108 and 109 having differential areas proportionate to the effective cross sectional areas of the body bores 110 and 111, respectively. Increasing fuel pressure in line 27 is communicated through the valve clearance space 112 against the upper face of diaphragm 108, causing the valve to open and to pass increased flow of fuel to the engine.

Space 113 above diaphragm 109 is connected with the air intake passage 15 above the throttle by way of passage 114. As the throttle closes and the manifold depression increases, the pressure on the upper surface of diaphragm 109 decreases, with the result that needle valve 106 closes partially to restrict the fuel passage and to give the previously described compensating effect. While closing movement of the valve is resisted by the fuel pressure against diaphragm 108, and coil spring 115, diaphragm 109 is made sufficiently large in area to establish a pressure differential capable of overcoming these resisting pressures. When the manifold pressure increases, as when the throttle is opened, and an increase in pressure occurs in chamber 113, spring 115 and the fuel pressure exerted against diaphragm 108 act to open the needle valve to its normal position. The valve action may be regulated by adjusting nut 116 to vary the spring tension.

Fig. 11 shows a further variational form of the same valve parts, in which the fuel supply passage to the engine is modified in accordance with changes in throttle position. By-pass valve 44, connected to the throttle shaft through arm 45 and link 47, operates as previously described with reference to the same valve in Fig. 1. A second valve 117 in the high pressure line 27 is operated simultaneously with valve 44 by way of a pin and slot connected at 118 between link 47 and the valve arm 119. At closed throttle position, valve 117 preferably will be at least slightly open. Then as the throttle moves toward open position, valve 117 opens to permit increased fuel delivery to the manifold 20. Simultaneously, valve 44 closes to restrict the fuel by-pass through line 42 and increases the fuel pressure in line 27 at the high pressure side of valve 117.

In the form shown in Fig. 12, such compensating valve devices as shown in Figs. 10 and 11 and at 32 in Fig. 1 are entirely dispensed with, and the effect of the manifold depression at closed throttle positions upon the fuel metering is compensated by the simple provision of a balance tube placing the pump supply float chamber in communication with the manifold. As shown in Fig. 12, line 27' connects directly with the injection fuel manifold 20', the various other elements in the system, except for the balance tube, being similar to and given the same reference characters as the corresponding parts in Fig. 1. Balance tube 310 is connected to the manifold 12 at 311, which may be at any point beyond the throttle, and with the top of the float chamber 71 as at 312, see Fig. 13.

In this instance the float chamber is not vented to the atmosphere, but to the manifold instead, and by reason of the balance tube connection, the pressures within the float chamber and manifold will at all times be the same. The compensating effect of this pressure balancing connection between the manifold and float chamber results from the fact that the capacity or fuel delivery rate of the injection pump is dependent upon the lifting of fuel from the lever L within the float chamber to the pump suction port 85, and that as the pressure within the float chamber is diminished, the rate at which fuel is taken into the pump likewise diminishes. Therefore at closed throttle position and lower manifold depression, a corresponding lowering of pressure in the float chamber reduces the pressure differential acting to lift the fuel to port 85, and reduces the rate of fuel delivery from the pump by diminishing the rate of fuel supply thereto. Since in this instance the effect of substantial manifold depression is compensated in the pump and float chamber assembly, and since the by-pass system operates to modify the rate of fuel delivery under all other conditions, when no substantial depression exists in the manifold, the necessity for pressure or flow control valves in line 27' between the pump and fuel manifold is eliminated.

Fig. 2 shows a further variational form and arrangement of valves in which a single pressure-controlled injection valve 120 supplies fuel for all the engine cylinders, eliminating the fuel manifold and several injection valves in the arrangement of Fig. 1. Valve 120, essentially similar to the previously described valve 32, consists of a body 121 containing a needle valve 122 carried by diaphragm 123 and seating against orifice 124 of the injection nozzle 125. The valve opens against the resistance of spring 126 as the fuel pressure in line 27 and body chamber 128 increases, to cause increased fuel discharge into the manifold. Throttle controlled by-pass valve 129 contains a normally open needle valve 130 carried by diaphragm 131, the valve being closed as the throttle opens by arm 132 acting on the diaphragm through spring 133 and a vertically movable cap 139 in the head of the valve body.

For the purpose of describing the general operation of the system and its various individual parts, I have referred to the partially diagrammatic showing of Fig. 1. I shall now describe another form of the invention embodying essentially the general system previously explained, but constructed in a manner particularly adapted for practical installation and operation, and for this purpose will refer to Fig. 15. Generally speaking, the assembly indicated at 140 includes the primary fuel pump, injection fuel pump, the back pressure valve, and the manifold depression operated valve, these parts corresponding in function respectively to pumps 30 and 25, and valves 32 and 52 of Fig. 1. The remaining valve parts including those corresponding to throttle operated by-pass valve 44 and the manually controlled valve 49 of Fig. 1, are mounted in an assembly positioned at the side of the manifold inlet 15, and are generally indicated at 141.

The combined pump and valve assembly 140 comprises a body 142 made up of sections 142a 142b and 142c, see Fig. 18, the latter section carrying a screwthreaded cover plate 143. The primary fuel pump, illustrated in detail at 144 in Fig. 18, is of the diaphragm type and is operated by shaft 145 journaled in bearings 146 and 147 at the ends of the lower body section 142b. Shaft 145 is driven in timed relation with the engine in the same manner previously described with reference to shaft 75 of the fuel pump shown in Figs. 1, 3 and 4. The pump diaphragm 148 is reciprocated in its pumping movement from an eccentric 149 on shaft 145 by engagement of the eccentric with a link 150 pivoted at 151 to the body, and pivoted at 152 to an arm 153 attached by nut 154 to the diaphragm. Link 150, acting as an eccentric or cam follower, is maintained in engagement with eccentric 149 by coil spring 155 seating at 156 on the body and pressing against diaphragm 148.

Body section 142c carries inlet and outlet check valve assemblies 157 and 158, the latter comprising a bushing 159 having a valve seat 160, a plug 161 threaded into the bushing and having a fuel passing orifice 162, and a check valve 163 pressed against seat 160 by spring 164. Inlet valve 157 is similar except that its position is reversed so that check valve 165 seats with the pressure in the diaphragm chamber 166, instead of against it as in the case of check valve 163. When the pumping diaphragm 148 is pulled toward the left, fuel is drawn from supply line 29 through screen 167 past check valve 165 into the pumping chamber 166. During return movement of the diaphragm under the influence of spring 155, the fuel is forced past check valve 163 into passage 168 leading upwardly through body section 142a into space 169 beneath float valve 170.

Referring now to Figs. 15 and 16, the float valve assembly 170 comprises a needle valve 171 which operates to control the entry of fuel to float chamber 172 under the influence of float 173. The valve body 174 contains a fuel passage 175 leading upwardly from space 169, and a floating disk 176 having a slight clearance 177 from the wall of the body and seating on the upper end of an outlet passage 178 leading into a chamber 179 enclosed by wall 180, the fuel admitted to chamber 179 overflowing the upper edge of the wall into float chamber 172. As needle valve 170 is raised, fuel is also admitted to the float chamber through the valve orifice 181 and port 182.

Disk 176 operates as a valve to control the entry of fuel to the float chamber through passage 178 which has a large cross sectional area and substantially greater fuel passing capacity as compared to needle valve orifice 181. When needle valve 170 is just slightly open, fuel being delivered under small pressure from pump 144 rises from passage 175 through clearance space 177 around the disk, and through the needle valve orifice into the float chamber. However, as the needle valve opens further, the resultant increased rate of fuel flow past disk 176 causes the latter to raise, by virtue of the restricted clearance at 177, and to admit fuel to the float chamber through passage 178. My object in providing the disk valve controlled passage in addition to the needle valve orifice, is to enable the needle valve to regulate the flow of fuel in considerably greater quantities or rates than it could otherwise control without making the needle valve orifice of such great size as to entail undesirable changes and increases in size of the float and lever arrangement through which the needle valve is operated. Were the needle valve orifice area to be increased to have a comparable fuel passing capacity, the increased total pressure of the fuel tending to open a valve of correspondingly increased area, would necessitate impractical changes in the valve operating lever system, or a corresponding increase in size of the float.

The fuel passes from float chamber 172 through port 184 in its bottom wall, into a longitudinal body bore 185 closed at one end by plug 186. Bore 185 supplies fuel to a series of diaphragm pumps 187, 188 and 189 corresponding in function to pump 25 of Fig. 1. These pumps are identical, and a description of one will suffice for the others.

Referring again to Fig. 18, pump 188 comprises a diaphragm 190 connected by screw 191 to a vertically reciprocating block 193 which has a sliding fit within bore 194 of the upper body section. The lower portion of block 193 is slotted at 195 to receive a roller 196 carried on pin 197 and projecting below the bottom flanged end 193a of the block. Coil spring 198, confined between the lower face of body section 142a and the block flange 193a, presses roller 196 into engagement with an eccentric 199 on shaft 145. The three pump operated eccentrices 199, 200 and 201 are arranged at 120° apart on the shaft 156, so that at least one of the three pumps is at all times discharging fuel.

During downward deflection of the diaphragm 190 caused by expansion of spring 198, fuel is taken into the pumping chamber 202 from bore 185 through inlet check valve 203 of the form previously described. Then as the diaphragm is deflected upwardly by eccentric 199, fuel is discharged from the pumping chamber through check valve 204 into passage 205, shown in longitudinal section in Fig. 15. It will be understood that each of the pumps 187, 188 and 199 takes fuel from passage 185, and that each discharges into passage 205. This passage connects with a pipe 205 which serves as a by-pass line in the same manner as line 42 of Fig. 1, as will later appear.

Bore 205 connects via passage 207 with back pressure valve 208 which is similar in construction and function to valve 32 of Fig. 1. The fuel pressure acting against the under side of diaphragm 209 opens needle valve 210 permitting the fuel to discharge through passage 211 into line 212 connecting with the previously described fuel manifold 20 and associated nozzles. Opening of needle valve 210 is yieldably resisted by a spring 213 bearing against an adjustable plug 214. The vacuum operated valve, corresponding to valve 52 of Fig. 1, and which comes into operation when the vehicle is driving the engine or when operating on light load at high speed to by-pass fuel back to the pump intake, is generally indicated at 215 in Fig. 15. The valve structure is similar to back pressure valve 208 and need not be described in detail. The manifold depression is communicated to space 216 above the diaphragm of valve 215 by way of passage 217 and pipe 218 connecting at 219 with the manifold intake beyond the throttle. Valve 215 operates to by-pass fuel from bore 205 through passages 220 and 221 into the injection pump supply bore 185, the said passages corresponding respectively to pipe 53 and line 42 at the left of valve 52 in Fig. 1. With throttle 222 closed and the engine of the vehicle driving the motor, the resulting high manifold depression communicated through pipe 218 and passage 217 to space 216 above the valve diaphragm, causes valve 223 to unseat and fuel to by-pass through passages 220 and 221 into bore 185 at the suction side of pumps 187, 188 and 189.

Bore 205 at the right of bore 207, and pipe 206 comprise a portion of the by-pass line, the juncture between 205 and 207 corresponding to the connection between lines 27 and 42 in Fig. 1. The remainder of the by-pass circuit comprises a system of ports and passages in the valve assembly 141 on the manifold intake, and a pipe 225 connecting with line 226 leading to bore 185. A throttle operated valve mechanism 227, corresponding generally in its function to valve 44 in Fig. 1, comprises a needle valve 228 operating within a bushing 229 threaded into a horizontally extending bore of the valve body 230. Valve 228, carried by diaphragm 231, operates to control the by-pass of fuel from line 206 through passage 232 and port 233 into bore 234 which connects via passage 235 with line 225. Chamber 236 at the right of the valve diaphragm communicates with the by-pass line through bore 237, and closing movement of the valve is yieldably resisted by a spring 236a bearing against the diaphragm.

The valve operating linkage comprises a lever 238, pivotally mounted body 230 at 239, and a link 240 connecting the lever with arm 241 carried on the throttle shaft 242. When the throttle 222 is closed, and the valve operating parts are in the dotted line position shown, valve 228 remains open as a result of the fuel pressure exerted against the needle end of the valve. As the throttle is moved toward open position, the end 238a of lever 238 engages and closes the valve to progressively restrict the by-pass of fuel from line 206 to line 226, thereby increasing the fuel pressure acting against the end of valve 208 and accordingly increasing the rate of fuel supplied to the engine.

Here the choke valve, corresponding to valve 49 in Fig. 1, comprises a plug type valve 244 interposed in by-pass bore 234 and carrying an arm 245, see Fig. 20 by means of which the valve may be operated to partially or entirely restrict the flow of fuel through the by-pass line. I also show in Fig. 20 an additional by-pass regulating valve 246 which operates to control the flow through a lateral bore 247 leading from passage 232 at the inlet of the throttle control valve, and thence through orifice 248, bore 249 and an upper lateral passage 250 communicating through bore 251 with passage 235, see Fig. 15. Valve 246 is shown to be threaded into bushing 252 so as to be manually adjustable, or it may have a sliding fit within bushing 252 to be capable of straight longitudinal movement and to be operatively connected to thermostatic or altitude pressure compensating devices previously referred to at 66 and 68 in Fig. 1.

In Fig. 17 I show a further variational form of the invention essentially similar to that of Fig. 15 but differing in the arrangement of the back pressure and manifold depression operated valves, and embodying certain additional features designed to improve the operation of the system under conditions of engine acceleration. The primary pump and injection pump assemblies, generally denoted at 140 in Fig. 15, are similar in the two forms except that in Fig. 17, the back pressure and manifold depression operated valves 253 and 254, corresponding to valves 214 and 215 of Fig. 15, are mounted on the side of manifold intake 15 instead of on the pump assembly block 142. In this last variational form, fuel is discharged by the pumps 187, 188 and 189 to line 206 and into bore 255 in the wall of the manifold intake 15, the fuel then flowing through bore 256 to the valve 253. As in the previously described forms valve 253 operates to control the delivery of fuel through bore 257 into pipe 258 which connects with the fuel manifold 20.

The valve assembly at 141 is in all respects similar to that previously described with reference to Fig. 15. As will be readily understood, fuel by-passed under control of throttle operated valve 228 is diverted from the high pressure line at the juncture 259 of bores 232 and 255. Fuel by-passed under control of valve 254 flows through port 260 past the valve into passage 261 connecting with bore 251, both by-pass fuel streams controlled by valves 228 and 254 being returned to the pump suction passage 185 via lines 225 and 226. The manifold depression is communicated to the diaphragm of valve 254 by way of bore 262 leading into the air intake passage 15.

In order to provide temporary, comparatively rich fuel mixtures for engine acceleration, as when the throttle is suddenly opened, I have added to the linkage connecting valve 228 with the throttle, means whereby sudden opening of the throttle results in what may be termed an over-closing of valve 228 so as to temporarily increase the fuel pressure applied to valve 253 and the rate of fuel flow to the engine. Then at the end of the interval of acceleration, the acceleration fuel control means operates automatically and without necessity for further throttle adjustment, to return valve 228 to its normal position and to restore the fuel in passage 255 to its normal pressure. For purposes of illustration, I have shown one particular type of device capable of increasing, in accordance with throttle movements, the rate of fuel flow to the engine during periods of acceleration, but with the understanding that this device is to be regarded merely as typical of various means that may be employed to accomplish the same general results.

The throttle operated valve control mechanism, generally indicated at 263, comprises a small guide cylinder 264, see Fig. 19, connected to a throttle shaft arm 265 by screw 266 carrying a flange nut 267, the latter sliding within a longitudinal slot 268 in arm 255. Rod 269 projecting within cylinder 264a is pivotally connected at its lower end to lever 270 by pin 271, the lever in turn being pivoted on the valve body 272 near its forward end. The opposite end of lever 270 is attached to a coil spring 273 attached at 274 to the side of the manifold intake and acting to resist downward swinging movement of the lever about pivot 272 toward the dotted line position 270a. Cylinder 264 and rod 269 serve essentially as a guide and stop assembly, the rod having substantial clearance from the wall and the cylinder bore, or the latter being vented at 276 in order that the rod and cylinder may telescope freely.

The valve over-closing device proper includes a plunger rod 277 attached to arm 255 by screw 278 carrying a flanged nut 279 movable longitudinally in slot 268, and positioned at the outside (with reference to shaft 280, the center of rotation of arm 255) of the connection between cylinder 264 and the arm. Plunger rod 267 extends through packing gland 281 in the head of cylinder 282, and carries an apertured washer 283 which is longitudinally movable on the rod between flange 284 and nut 285. Upon downward movement of the plunger rod within the cylinder, flange 284 closes apertures 286 to restrict the escape of air, oil or other suitable liquid from the cylinder chamber 287 to such an extent that the plunger movement, or at least part of its movement, will be transmitted through the cylinder to lever 270, the lower end 282a of the cylinder being mounted on pin 271 and thus pivotally connected to the lever. Upward movement of plunger rod 277 is comparatively unrestrained since at this time washer 283 engages nut 285, leaving apertures 286 open to by-pass air or fluid from the upper interior 287a of the cylinder into the lower chamber 287.

In the absence of the plunger and cylinder assembly 277, 282, as the throttle is opened, guide cylinder 264 would move down during the first interval of throttle opening until the upper end of this cylinder bore came into engagement with the upper end of rod 269, during which interval valve 228 would remain in its normal open position. As the throttle then is moved to full open position, the last interval of throttle opening movement would act to move valve 228 toward closed position through arm 225, guide cylinder 264, rod 269 and lever 270a, the final position of valve 228 being predetermined to give the proper fuel mixture for wide open throttle position.

By reason of the addition of the plunger and cylinder assembly 277, 282, however, when the throttle is opened suddenly, valve 228 is moved toward closed position ahead of the movement which it would otherwise have, and in addition, is temporarily over-closed, that is it is moved in a closing direction beyond the position which it normally has at wide open throttle position. As the throttle is suddenly open for acceleration, and the linkage connecting lever 255 with valve 228 moves from the solid line to the dotted line positions of Fig. 17, the plunger flange 234 closes apertures 286 causing the plunger movement to be communicated via cylinder 282 to lever 270 and thence to the valve. During this time lever 270 is moved sufficiently in advance of guide cylinder 264 that rod 269 does not come into engagement with the upper end of the cylinder bore, all movement being transmitted through the plunger and cylinder. The result is that valve 228 is over-closed so that during the period of acceleration, when a richer fuel mixture is desired, the fuel by-pass is abnormally restricted and the fuel pressure communicated to valve 253 is abnormally high.

After the throttle has reached full open position, however, the parts gradually return to their normal positions due to the slow leakage of air or fluid around the plunger washer 283 under the influence of spring 273. Leakage of air or fluid around washer 283 continues to the point at which rod 269 engages the upper end of bore 264a, valve 228 meanwhile opening from its over-closed position to its normal position at wide open throttle.

In certain installations it may also be desirable to supply enriched fuel mixtures to the engine in accordance with sudden increases in the manifold pressure, for the purpose of accomplishing the same general purposes as the described throttle controlled accelerating device, and in addition, to meet demands for enrichment of the fuel mixture under conditions that do not necessarily result from changes in the throttle position alone. Such condition may arise, for example, when the engine suddenly takes load with the throttle remaining in substantially unchanged position. For the purpose of thus increasing the fuel to air ratio in accordance with sudden increases in the manifold pressure, I provide a diaphragm controlled valve 290 placed at the by-pass line between pipes 225 and 226.

Valve 290 comprises body sections 290a and 290b between which is clamped a diaphragm 291 carrying a valve 292. The valve is also attached to a second diaphragm 293 clamped between body section 290b and a lower section 290c. Spring 294, acting against diaphragm 291, normally holds the valve in open position, permitting comparatively unrestricted flow of the by-pass fuel from line 225 through the valve orifice 295 and chamber 296 to line 226. Chambers 300 and 301 above the upper and lower diaphragms respectively, communicate with pipe 325 connecting with the manifold, by way of passages 302 and 303. Chamber 304 beneath the upper diaphragm communicates with passage 303 via a port 305 of such small size as to greatly restrict the passage of air therethrough.

Normally, no substantial pressure differential exists at opposite sides of diaphragm 291, the pressure existing in line 325 being communicated via passage 302 to chamber 300, and via port 305 to chamber 304. With the pressures on diaphragm 291 balanced, the valve is held open by spring 294 and the fuel pressure exerted against the underside of diaphragm 293. It will be understood that under partial throttle conditions, the pressure in line 325 and that existing within chambers 300 and 304 will be comparatively low, since the presupposed condition is one under which the engine is operating under comparatively light load.

Assume now that the pressure in line 325 suddenly increases to a sudden increase in engine load or throttle opening. There immediately results a pressure differential at opposite sides of diaphragm 291 due to the fact that the pressure increase is immediately communicated to space 300, but because of the restriction at 305, the pressure can only build up slowly in chamber 304 to the point that the pressure balance on the diaphragm will be restored. Due to the pressure differential at diaphragm 291, valve 292 is moved down against the resistance of spring 294 and the pressure acting upwardly against diaphragm 293, restricting the by-pass of fuel through orifice 295 and accordingly increasing the fuel pressure in passage 256 leading to the back pressure valve 253. The flow of fuel through the by-pass system thus is restricted during the interval following the sudden increase in manifold pressure, and the restriction continues until sufficient air bleeds through port 305 into chamber 304 to restore the pressure balance on the upper diaphragm and to thereby raise the valve to its upper normal open position.

It may be mentioned that in a single system, both the throttle controlled valve over-closing mechanism 263 and the manifold pressure operated valve 290 may be utilized in conjunction with the by-pass system, or it may be preferred to dispense with one or the other of these devices for the reason that under normal operating conditions, both will respond to sudden opening of the throttle, the one through direct operation from the throttle, and the other in response to sudden increase in manifold pressure.

In all the described forms of the invention, air is taken into the manifold at atmospheric pressure. Since for some purposes it may be desirable to supercharge the engine with air, I have shown in Fig. 14 a modified form of the invention adapted to this mode of operation. The only differences over the first described form of Fig. 1 consist in the provision of a supercharger, diagrammatically indicated at 314, attached to the air intake passage 315 to force air into the manifold 12 at superatmospheric pressure, and a fuel by-pass regulator 316 which operates to increase the fuel ratio in the combustible mixture in proportion to the increased quantity of air supplied by the supercharger. Regulator 316 comprises a body 317 containing a diaphragm 318 to which is attached a rod 319 connecting with the by-pass valve 320. Space 321 above the diaphragm communicates via tube 322 with the manifold, so that the manifold pressure will at all times be applied to the top surface of the diaphragm. Downward deflection of the latter is resisted by a coil spring 323 contained within the lower portion of the body.

At open throttle positions, increased manifold pressure due to air being forced in under superatmospheric pressure by the supercharger 314, acts against the top surface of diaphragm 318 to move rod 319 downwardly, closing the normally open valve 320 to restrict the by-pass of fuel from line 27 to by-pass line 42, and thereby increasing the rate of fuel injection into the manifold. As the throttle is closed and the manifold pressure drops, spring 323 acts to raise the diaphragm and rod 319, opening valve 320 to increase the rate of fuel flow to the by-pass line and to decrease the rate of fuel injection into the manifold.

I claim:

1. In apparatus for feeding fuel to internal combustion engines in which air is supplied to an engine cylinder through a throttle controlled passage; a positive displacement pump operated in timed relation with the engine, a discharge line leading from the pump, a nozzle fed from said line and continuously discharging fuel through an orifice into the air stream flowing to the engine at a point between said throttle and the cylinder, a check valve in the discharge line at said nozzle, means in said line controlled independently of the pump for maintaining a predetermined back pressure on the fuel stream flowing to the nozzle, said means comprising a valve that continuously passes fuel and opens in response to the fuel pressure, said valve normally restricting the fuel stream to a greater degree than the restriction offered by said orifice, a by-pass line leading from said line at a point between said pump and valve to the suction side of the pump, and means controlled independently of the pump for regulating the flow of fuel through said by-pass line to modify said back pressure in accordance with changing conditions of engine operation.

2. In apparatus for feeding fuel to internal combustion engines in which air is supplied to an engine cylinder through a throttle controlled suction passage; a positive displacement pump operated in timed relation with the engine, a discharge line leading from the pump, a nozzle fed from said line and continuously discharging fuel into the air stream flowing through said suction passage to the engine, through an orifice located in the suction passage at a point between said throttle and the cylinder, said orifice being exposed to the variable subatmospheric pressure existing in said suction passage, means independent of the pump and movable in response to increases of the fuel pressure in said line to pass fuel to said orifice at an increasing rate, said means continuously passing fuel and maintaining a predetermined back pressure on the fuel stream flowing to the nozzle, a by-pass line connecting said discharge line with the suction side of the pump, and means controlled independently of said pump for regulating the flow of fuel through said by-pass line to modify said back pressure in accordance with changing conditions of engine operation.

3. In apparatus for feeding fuel to internal combustion engines in which air is supplied to an engine cylinder through a throttle controlled suction passage; a positive displacement pump operated in timed relation with the engine, a discharge line leading from the pump, a nozzle fed from said line and continuously discharging fuel into the air stream flowing through said suction passage to the engine, through an orifice located in the suction passage at a point between said throttle and the cylinder, said orifice being exposed to the variable subatmospheric pressure existing in said suction passage, means in said line controlled independently of the pump for maintaining a predetermined back pressure on the fuel stream flowing to the nozzle, said means comprising a valve that continuously passes fuel to said orifice at an increasing rate as the fuel pressure increases, a diaphragm associated with the valve and causing it to open in response to pressure increase in said discharge line to pass fuel at an increasing rate, yielding means resisting opening movement of the valve, a by-pass line leading from said line at a point between said pump and valve to the suction side of the pump, and means controlled independently of the pump for regulating the flow of fuel through said by-pass line to modify said back pressure in accordance with changing conditions of engine operation.

4. In apparatus for feeding fuel to internal combustion engines in which air is supplied to an engine cylinder through a throttle controlled suction passage; a positive displacement pump operated in timed relation with the engine, a discharge line leading from the pump, a nozzle fed from said line and continuously discharging fuel into the air stream flowing through said suction passage to the engine through an orifice located in the suction passage at a point between said throttle and the cylinder, said orifice being exposed to the variable subatmospheric pressure existing in said suction passage, means responsive to the fuel pressure in said line and controlled independently of the pump for maintaining a predetermined back pressure on the fuel stream flowing to the nozzle, said means comprising a valve that continuously passes fuel to said orifice and is positioned at and controls the flow of fuel through said nozzle orifice, a diaphragm associated with the valve and causing it to open in response to pressure increase in said discharge line, yielding means resisting opening movement of the valve, a by-pass line leading from said line at a point between said pump and valve to the suction side of the pump, and means controlled independently of the pump for regulating the flow of fuel through said by-pass line to modify said back pressure in accordance with changing conditions of engine operation.

5. In apparatus for feeding fuel to internal combustion engines in which air is supplied to an engine cylinder through a throttle controlled suction passage; a positive displacement pump operated in timed relation with the engine, a discharge line leading from the pump, a nozzle fed from said line and continuously discharging fuel into the air stream flowing through said suction passage to the engine, through an orifice located in the suction passage at a point between said throttle and the cylinder, said orifice being exposed to the variable subatmospheric pressure existing in said suction passage, means independent of the pump and movable in response to increases of the fuel pressure in said line to pass fuel to said orifice at an increasing rate, said means continuously passing fuel and maintaining a predetermined back pressure on the fuel stream flowing to the nozzle, a by-pass line connecting said discharge line with the suction side of the pump, means responsive to sudden increase in the suction passage pressure for temporarily increasing the normal rate of fuel discharge from said orifice, and means controlled independently of said pump for regulating the flow of fuel through said by-pass line to modify said back pressure in accordance with changing conditions of engine operation.

6. In apparatus for feeding fuel to internal combustion engines in which air is supplied to an engine cylinder through a throttle controlled suction passage; a positive displacement pump operated in timed relation with the engine, a discharge line leading from the pump, a nozzle fed from said line and continuously discharging fuel into the air stream flowing through said suction passage to the engine, through an orifice located in the suction passage at a point between said throttle and the cylinder, said orifice being exposed to the variable subatmospheric pressure existing in said suction passage, means independent of the pump and movable in response to increases of the fuel pressure in said line to pass fuel to said orifice at an increasing rate, said means continuously passing fuel and maintaining a predetermined back pressure on the fuel stream flowing to the nozzle, a by-pass line connecting said discharge line with the suction side of the pump, means responsive to sudden throttle opening for temporarily increasing the normal rate of fuel discharge from said orifice, and means controlled independently of said pump for regulating the flow of fuel through said by-pass line to modify said back pressure in accordance with changing conditions of engine operation.

7. In apparatus for feeding fuel to internal combustion engines in which air is supplied to an engine cylinder through a throttle controlled suction passage; fuel supply means comprising a fuel chamber having an outlet passage, a float operated valve controlling fuel flow through said passage, a pump discharging fuel into said chamber, and a positive displacement pump operated in timed relation with the engine and taking fuel from said fuel chamber outlet passage; a discharge line leading from said positive displacement pump, a nozzle fed from said line and continuously discharging fuel into the air stream flowing through said suction passage to the engine, through an orifice located in the suction passage at a point between said throttle and the cylinder, said orifice being exposed to the variable subatmospheric pressure existing in said suction passage, means independent of the positive displacement pump and movable in response to increases of the fuel pressure in said line to pass fuel to said orifice at an increasing rate, said means continuously passing fuel and maintaining a predetermined back pressure on the fuel stream flowing to the nozzle, a by-pass line connecting said discharge line with the suction side of the pump, and means controlled independently of said pump for regulating the flow of fuel through said by-pass line to modify said back pressure in accordance with changing conditions of engine operation.

EDWARD A. WINFIELD.